United States Patent
Santos et al.

(10) Patent No.: US 8,058,868 B2
(45) Date of Patent: Nov. 15, 2011

(54) TURNING DEVICE POSITION SENSING SYSTEM AND METHOD

(75) Inventors: Alfred John Santos, Keene, NH (US); Mark E. LaCroix, Winchester, NH (US); Wayne V. Denny, Alliance, OH (US)

(73) Assignee: Timken US Corporation, Canton, OH (US)

( * ) Notice: Subject to any disclaimer, the term of this patent is extended or adjusted under 35 U.S.C. 154(b) by 505 days.

(21) Appl. No.: 12/282,633

(22) PCT Filed: Apr. 10, 2007

(86) PCT No.: PCT/US2007/066347
§ 371 (c)(1),
(2), (4) Date: Sep. 11, 2008

(87) PCT Pub. No.: WO2007/121192
PCT Pub. Date: Oct. 25, 2007

(65) Prior Publication Data
US 2009/0091316 A1    Apr. 9, 2009

Related U.S. Application Data

(60) Provisional application No. 60/791,359, filed on Apr. 10, 2006, provisional application No. 60/805,527, filed on Jun. 22, 2006.

(51) Int. Cl.
*G01B 7/30* (2006.01)
(52) U.S. Cl. .................. 324/207.25; 310/68 B
(58) Field of Classification Search ............. 324/207.25; 310/68 B
See application file for complete search history.

(56) References Cited

U.S. PATENT DOCUMENTS

| | | |
|---|---|---|
| 6,577,121 B1 | 6/2003 | Adelerhof et al. |
| 6,841,958 B2 | 1/2005 | Desbiolles et al. |
| 2004/0070391 A1 | 4/2004 | Muszynski |
| 2006/0059698 A1 | 3/2006 | Staudt |

FOREIGN PATENT DOCUMENTS

| | | |
|---|---|---|
| DE | 202004014849 | 2/2005 |
| EP | 1408307 | 4/2004 |

OTHER PUBLICATIONS

International Search Report and Written Opinion for PCT/US2007/066347, dated Oct. 15, 2007, 9 pages.

*Primary Examiner* — Reena Aurora
(74) *Attorney, Agent, or Firm* — Michael Best & Friedrich LLP

(57) ABSTRACT

A system for determining an absolute position of a motor. The system includes first and second multi-polar magnetic rings, first and second processing units, and at least one external sensor. The first multi-polar magnetic ring is concentrically positioned around the motor, and has a plurality of pole pairs. The second multi-polar magnetic ring is concentrically positioned around the first multi-polar magnetic ring, and has at least one pole pair. The first processing unit is positioned near the first multi-polar magnetic ring to determine an angular position over one of the pole pairs of the first multi-polar magnetic ring. The sensor is positioned external to the processing unit and over the second multi-polar magnetic ring to indicate a state of the pole pair of the second multi-polar magnetic ring. The second processing unit generates an absolute position of the motor based on the angular position and the state.

23 Claims, 5 Drawing Sheets

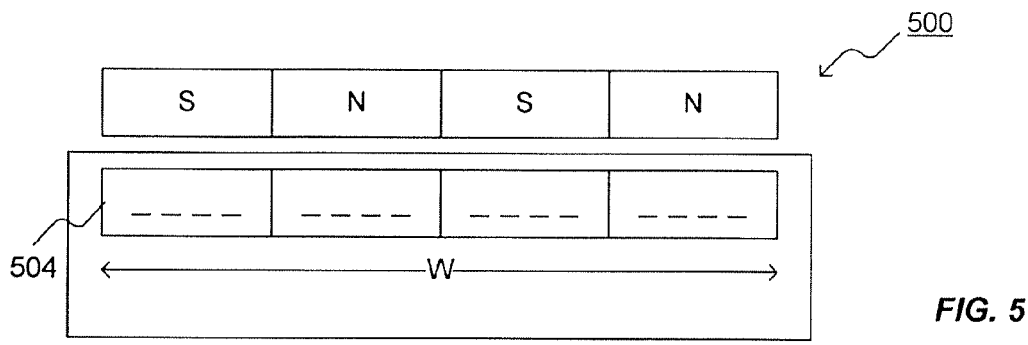
*FIG. 5*
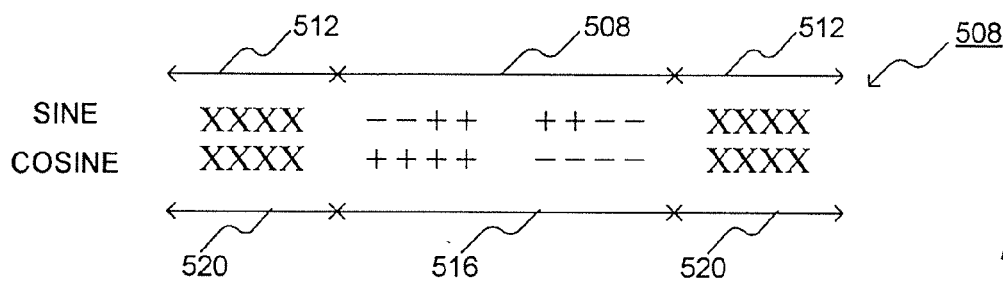
*FIG. 6*
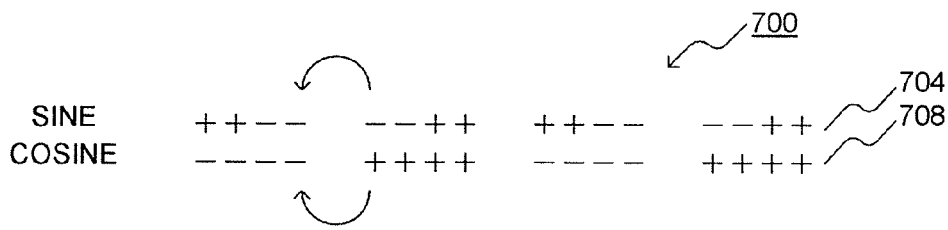
*FIG. 7*
| QUADRANT | Rp |
|---|---|
| Q1 | 000000 |
| Q2 | C0C0C0 |
| Q3 | CDCDCD |
| Q4 | 0D0D0D |
*FIG. 10*

TURNING DEVICE POSITION SENSING SYSTEM AND METHOD

RELATED APPLICATIONS

This application claims priority to U.S. Provisional Patent Application Ser. Nos. 60/791,359, filed on Apr. 10, 2006, and 60/805,527, filed on Jun. 22, 2006, the entire contents of which are incorporated herein by reference.

FIELD

Embodiments of the invention relate generally to sensing systems and methods, and particularly to sensing system controls.

BACKGROUND

In many motor applications, positions of the motor are sensed. Once motor positions are sensed, power can be applied to operate these motors accordingly. Different applications have different motor phase sensing requirements. For example, the Timken Company's MPS160 can be used to determine an absolute position of a target magnet. However, chips such as the MPS160 typically can only be used to determine the absolute position of the target within each North (N)/South (S) pole pair only. These pole pairs can be up to 6 mm wide in some performance configurations. Furthermore, to cover ⅓, ¼, or ⅕ of a revolution, a very large single absolute position sensor chip may be required. A large single absolute position sensor can be difficult to apply in many applications, such as those that have a space limitation.

There are several application-specific-integrated-circuits ("ASIC's") collectively referred to as motor sensors, that can be used to sense positions of a motor. For example, Timken's MPS32XF produces high resolution signals from a wide range of magnetic pole widths. This motor sensor is programmable and equipped with a Hall sensor array.

In some steering wheel applications, for example, in order to accurately control or activate a steering column, an absolute steering column position is needed over multiple turns of the steering wheel or column. To determine an absolute steering column position, some controllers will combine outputs of a turn counter with a position signal of a steering wheel over one revolution as provided by a sensing device. However, implementing a turn counter can be costly and can increase complexity of the sensing device.

SUMMARY

In one form, the invention provides a system for determining an absolute position of a motor. The system includes first and second multi-polar magnetic rings, first and second processing units, and at least one external sensor. The first multi-polar magnetic ring is concentrically positioned around the motor, and has a plurality of pole pairs. The second multi-polar magnetic ring is concentrically positioned around the first multi-polar magnetic ring, and has at least one pole pair. The first processing unit is positioned near the first multi-polar magnetic ring to determine an angular position over one of the pole pairs of the first multi-polar magnetic ring. The at least one sensor is positioned external to the processing unit and over the second multi-polar magnetic ring to indicate a state of the at least one pole pair of the second multi-polar magnetic ring. The second processing unit generates an absolute position of the motor based on the angular position and the state.

In another form, the invention provides a sensing system for determining an absolute position of a turning device. The sensing system includes first magnetic and second multi-polar magnetic rings, first and second processing unit, and first and second sensors. The first multi-polar magnetic ring is concentrically positioned around the turning device, and has a plurality of pole pairs to rotate with the turning device. The second multi-polar magnetic ring is positioned around the first multi-polar magnetic ring, has at least one pole pair and is configured to rotate with the first multi-polar magnetic ring and the turning device. The first processing unit is positioned near the first multi-polar magnetic ring to determine an angular position of the turning device based on one of the pole pairs of the first multi-polar magnetic ring. The first sensor is positioned external to the first processing unit and adjacent the second multi-polar magnetic ring to indicate a first state of the at least one pole pair of the second multi-polar magnetic ring. The second sensor is positioned external to the first processing unit, adjacent the second multi-polar magnetic ring, and spaced apart from the first sensor to indicate a second state of the at least one pole pair of the second multi-polar magnetic ring. The second processing unit generates the absolute position of the turning device based on the angular position and the first and second states.

In still another form, the invention provides a method of determining an absolute position of a turning device with a first multi-polar magnetic ring concentrically positioned around the turning device, a second multi-polar magnetic ring concentrically positioned around the first multi-polar magnetic ring, a processing unit positioned over the first multi-polar magnetic ring, and at least one sensor positioned near the processing unit and over the second multi-polar magnetic ring. The method includes determining with the processing unit a local pole position of the first multi-polar magnetic ring, determining from the at least one sensor at least one state of the second multi-polar magnetic ring, and determining from the at least one state and the local pole position an absolute position of the turning device.

Other aspects of the invention will become apparent by consideration of the detailed description and accompanying drawings.

BRIEF DESCRIPTION OF THE DRAWINGS

FIG. 5 shows a Hall sensor array arrangement that can be incorporated into the sensing systems of FIG. 1 and FIG. 3.

FIG. 6 shows a summing Hall sensor configuration of the Hall sensor array of FIG. 5.

FIG. 7 shows a dual full period Hall sensor configuration of the Hall sensor array of FIG. 5.

FIG. 10 shows a plurality of exemplary reference pulse patterns.

DETAILED DESCRIPTION

Figure 1:
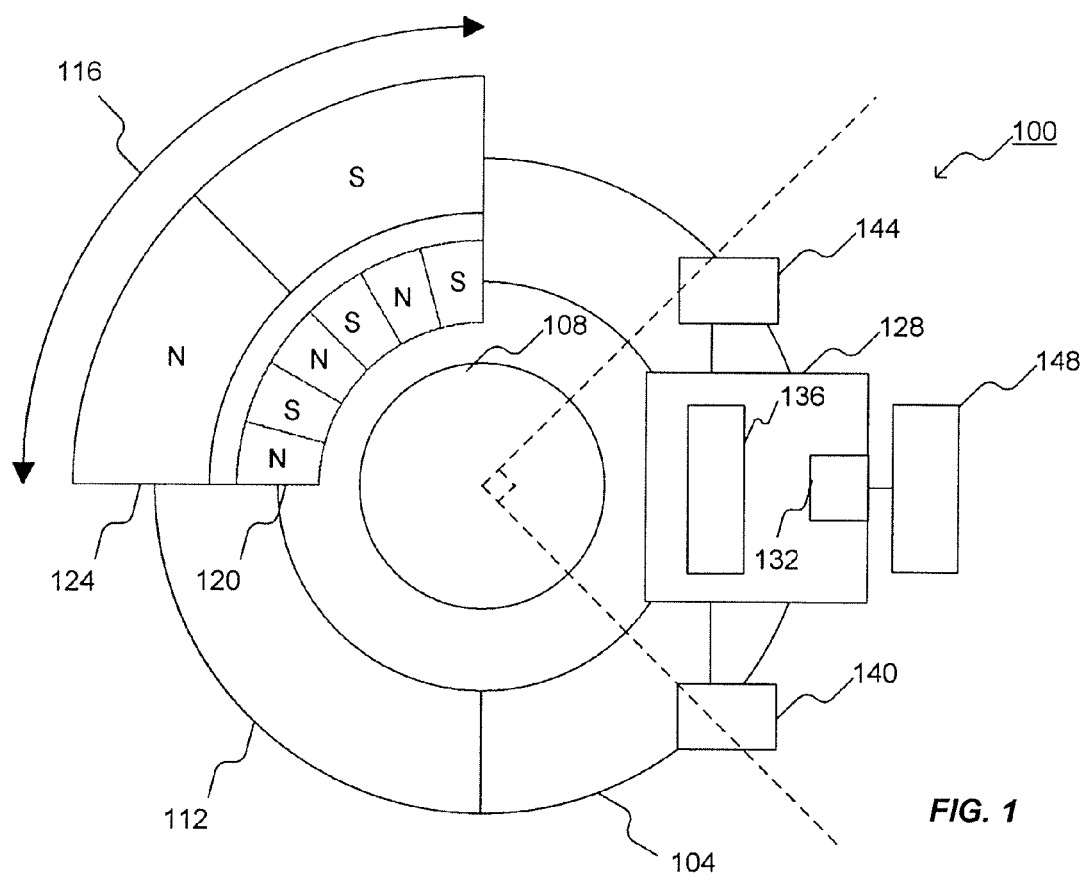
FIG. 1 shows a first exemplary absolute position sensing system for a motor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processing unit" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

As described earlier, sensing ASICs such as MPS160 chips are capable of determining the absolute position of a target magnet within one North/South pole pair only; however, these pole pairs can be up to 6 mm wide in certain high performance configurations.

In one form, the invention provides a method of determining an absolute position of a motor over each motor phase for a motor position sensing controller. The method involves combining absolute position information that is accurate and specific to a North/South pole pair with coarse information that is indicative of position relative to the entire Hall string. Accordingly, absolute position across the Hall string can be accurately determined.

In one embodiment, the method includes attaching one or more digital Hall sensors to the motor position sensing system to produce an absolute position signal over 2 or more pole pairs. The method also includes routing signal outputs from the attached sensors through the motor position sensing controller, and relaying the signal outputs via a data link.

In another form, the invention provides a system for determining an absolute position of a motor over each motor phase. The system includes a digital Hall sensor, a motor position sensing controller, and a data link. The digital Hall sensor is attached to the motor position sensing controller to produce an absolute position signal over 2 or more pole pairs. The attached sensor routes signal outputs through the motor position sensing system, and relays the outputs via the data link.

Timken's MPS32XF or other suitable sensor can be programmed to disable Hall cells on both ends of the Hall sensor array to properly match effective pole width of the motor sensor to the width of the target magnet poles. The number of Hall sensors used in the Hall sensor array varies from application to application. For instance, all of the Hall sensors are utilized when the target magnet pole width matches the total pole width offered by the Hall sensors. However, at times, the target magnet pole width does not match the total width offered by the Hall sensors. For example, a small number of poles are matched when only a portion of Hall sensors in the Hall sensor array are used. In such cases, there is a reduced signal-to-noise ratio ("SNR") because a reduced signal strength is produced by the Hall sensor array.

In another form, the invention provides a method and system of matching a pole width of a Hall sensor array with a pole width of a target magnet. Embodiments of the invention operate a sensing controller with all sensing elements in the array, or only a portion of the array. For example, the MPS32XF sensor has 16 Hall sensor elements. In some embodiments, the MPS32XF sensor can use 16 Hall elements or reduce the number of Hall elements to 12 or 8 by disabling the Hall elements on ends of the array. For small poles when only a portion of the Hall array is used, there is a reduced SNR because there a smaller signal produced by the Hall array.

In one particular embodiment, the invention describes a method that involves attaching one, two, or three digital Hall sensors to an MPS160 or similar chip to produce an absolute position signal over 2, 3, 4, or 5 pole pairs. The signals from these external sensors can be routed through an ASIC and provided to an external system via a serial data link. This sensor and magnet configuration can fulfill the requirements of many motor applications.

For example, FIG. 1 shows a first exemplary absolute position sensing system 100 for a motor 104 having an armature, shaft, or rotor 108, and a stator 112. In the embodiment shown, the stator 112 has four magnetic segments or arcs 116. Each of the segments 116 contains a magnetic pole pair, and occupies an arc of about 90°, which is one-quarter (¼) of a revolution (360°). As such, the motor 104 as shown is a 4-pole motor.

The first sensing system 100 includes a first multi-polar magnetic ring or high resolution track 120, which includes 12 magnetic pole pairs. It should be noted that only the high resolution track 120 of one of the segments 116 is shown. As such, FIG. 2 only shows three magnetic pole pairs. The high resolution track 120 is concentrically positioned with respect to the rotor 108. A second multi-polar magnetic ring or a low resolution track 124 concentrically encompasses the high resolution track 120. In the embodiment shown, the low resolution track 124 includes four magnetic pole pairs. It should be noted that the high resolution track 120 can have more or less magnetic pole pairs in other embodiments. Similarly, the low resolution track 124 can have more magnetic pole pairs in other embodiments Furthermore, the first sensing system 100 includes a processing unit 128 that is positioned over the stator 112, the high resolution track 120, and the low resolution track 124. An exemplary processing unit is a Timken sensor MPS160, which can generate signals that indicate one out of 160 angular positions over one of the pole pairs of the high resolution track 120, and a reference pulse signal that indicates a center position. In some embodiments, the processing unit 128 includes an interface 132 for interfacing with components external to the processing unit 128. In other embodiments, the interface 132 is external to the processing unit 128. The processing unit 128 also includes an internal sensor array 136 to generate an output that is indicative of an angular position of a pole pair under the processing unit 128. It should be appreciated that the internal sensor array 136 can include a string of sensing elements such as Hall effect sensors. The first sensing system 100 also includes a first external sensor 140 that is positioned over the low resolution track 124. In the embodiment shown, the first external sensor 140 is a Hall effect sensor. Additionally, the first sensing system 100 also includes a second external sensor 144 that is positioned over the low resolution track 124. Particularly, the second external sensor 144 is positioned less than or about 90° from the first external sensor 140. In the embodiment shown, the second external sensor 144 is also a Hall effect sensor.

In general, a number of pole pairs used in the high resolution track 120 used in a particular application determines a number of external sensors needed. In the embodiment shown, since there are three pole pairs to be identified, a number of low resolution pole pairs is one, and since only one of the three pole pairs will activate a particular external sensor, only a total of two external sensors are necessary. Two external sensors will generally provide a total of four logically unique combinations. For example, when an output of the first external sensor 140 is inactive and an output of the second external sensor 144 is inactive, neither of the first and second external sensors 140, 144 are active, or both are in an OFF state. Similarly, when the output of the first external sensor 140 is inactive and the output of the second external sensor 144 is active, the first external sensor 140 is in an OFF state, while the second external sensor 144 is in an ON state. For another example, if the number of pole pairs used in the high resolution track 120 is five times the number of pole pairs used in the low resolution track 124, a total of three external sensors will be necessary. In some embodiments, an additional sensor will also be used in conjunction with the determined number of external sensors due to tolerance issues such as magnet alignment.

A second processing unit 148 receives data or information indicative of the state signals and the angular signals from the first and second external sensors 140, 144, and the processing unit 128, respectively, through the interface 132. In some embodiments, the data or information is received in the form of a serial data signal via a serial data interface. The second processing unit 148 then processes the received data or information and generates an absolute position of the motor 104, detailed hereinafter.

Figure 2:
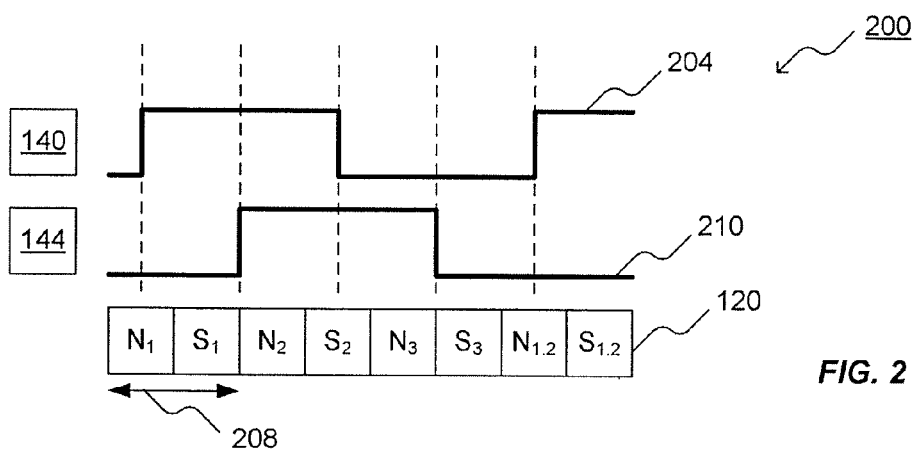
FIG. 2 shows a plurality of Hall sensor outputs with respect to magnetic pole pairs of FIG. 1.

FIG. 2 shows a plurality of external sensor outputs 200 with respect to the high resolution pole pairs 120 of FIG. 1. Particularly, outputs of the first external sensor 140 due to one of the corresponding pole pairs 208 is shown in waveform 204, while outputs of the second external sensor 144, which is positioned about 90° from the first external sensor 140, is shown in waveform 210. For example, when the first external sensor 140 is low, and the second external sensor 144 is low, the second processing unit 148 generates a signal that is indicative of a target pole pair being pole pair $N_1$, $S_1$.

In operation, the data from the processing unit 128 is received at the second processing unit 148. The data contains local absolute position information over one North-South pole pair of the motor 104. The data also contains the state of the raw reference pulse ("Rp") signal and the state of each external Hall sensor 140, 144. If the data from the example shown in FIG. 2 with two external Hall sensors 140, 144, and three high resolution pole pairs 120 per motor segment 116 are read, the second processing unit 148 or a user can use the information from the two external Hall sensors 140, 144 to determine if the absolute position reading was from the 1st, 2nd, or $3^{rd}$, North/South high resolution pole pair 120 in the corresponding segment 116. This is possible since the two external Hall sensors 140, 144 produce four states, and the user or the second processing unit 148 only needs to properly identify which one of the three high resolution pole pairs 120 is being reported in the absolute position data. For example, Timken's MPS160 can generate a number between 1 to 160 to indicate an angular position of one of the high resolution pole pairs. As such, when the MPS160 is used with a 4-pole motor with 12 high resolution pole pairs, the MPS160 generates an angular position of 80, which indicates of about 45° at a corresponding high resolution pole pair. Accordingly, if the second processing unit 148 determines that the angular position originates from the second high resolution pole pair in a corresponding segment, an absolute position can be obtained from the angular position of about 80 and the second pole pair (each pole pair being able to generate 160 positions). In such a case, the second processing unit 148 will determine that the absolute position is 240, which is a sum of 80 and 160.

Figure 3:
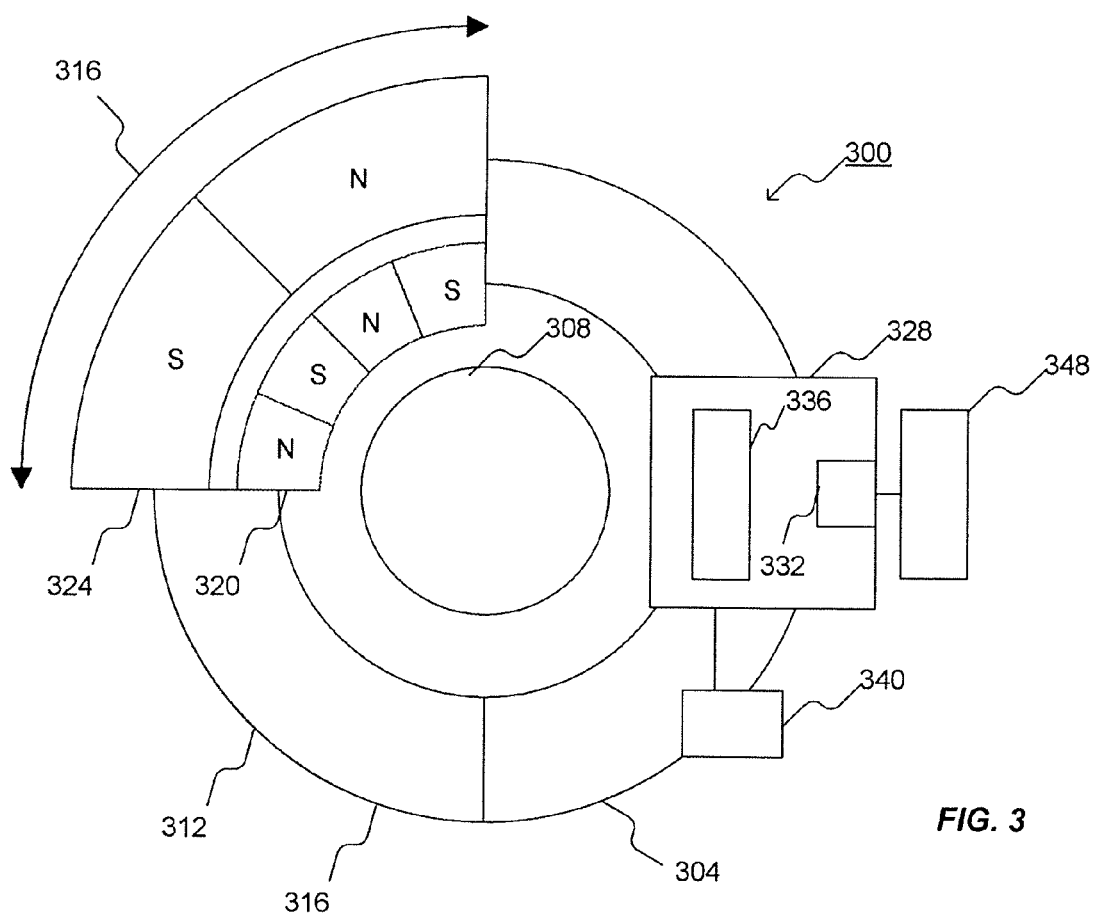
FIG. 3 shows a second exemplary absolute position sensing system for a motor.

FIG. 3 shows a second exemplary absolute position sensing system 300 for a motor 304 having an armature, shaft, or rotor 308, and a stator 312. In the embodiment shown, the stator 312 has four magnetic segments or arcs 316; thus, the motor 304 is a 4-pole motor. The second sensing system 300 includes a first multi-polar magnetic ring or high resolution track 320, which includes eight magnetic pole pairs. It should be noted that only the high resolution track 320 of one of the segments 316 is shown. As such, FIG. 3 only shows two magnetic pole pairs. The high resolution track 320 is concentrically positioned with respect to the rotor 308. A second multi-polar magnetic ring or low resolution track 324 having four pole pairs concentrically encompasses the high resolution track 320.

The second sensing system 300 includes a processing unit 328 positioned over the stator 312, the high resolution track 320, and the low resolution track 324. Like the processing unit 128 of FIG. 1, the processing unit 328 also includes an optional interface 332 for interfacing with components external to the processing unit 328, and an internal sensor array 336 to generate an output that is indicative of an angular position of a pole pair under the processing unit 328. The second sensing system 300 also includes an external sensor 340 that is positioned over the low resolution track 324. In the embodiment shown, the external sensor 340 is a Hall effect sensor.

As indicated earlier, the number of pole pairs used in the high resolution track 320 used in a particular application generally determines the number of external sensors needed. In the embodiment shown, since there are two pole pairs to be identified, and since only one of the two pole pairs will activate the external sensor 340, only one external sensor is thus necessary. Particularly, one external sensor will generally provide a total of two logically unique combinations. For example, when an output of the external sensor 340 is inactive, the external sensor 340 is in an OFF state. Conversely, when the output of the external sensor 340 is active, the external sensor 340 is in an ON state.

A second processing unit 348 then receives data or information indicative of the state and the angular signals from the external sensor 340 and the reference pulse signals from the processing unit 328, respectively, through the interface 332. As discussed earlier, the data or information can be received in the form of a serial data signal via a serial data interface. The second processing unit 348 then processes the received data or information and generates an absolute position of the motor 104, detailed hereinafter.

Figure 4:
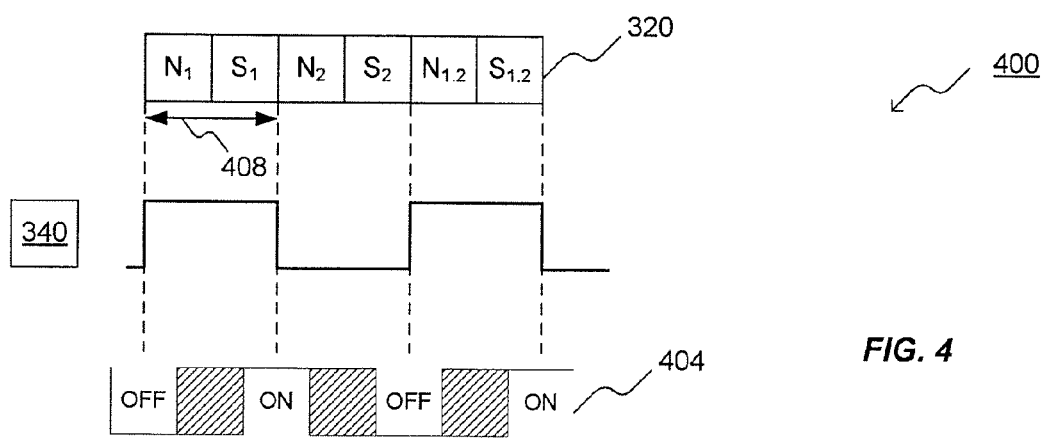
FIG. 4 shows a set of Hall sensor outputs with respect to magnetic pole pairs of FIG. 3.

FIG. 4 shows an output waveform 400 generated by the external sensor 340 with respect to the high resolution pole pairs 320 of FIG. 3. Due to tolerance issues relating to magnet precision and alignment, the reference pulse signals from the processing unit 328 are also used in the second processing unit 348 to determine the absolute position. In such a case, the reference pulse waveform 404 is also shown.

Particularly, in the case of two high resolution pole pairs 320 per motor segment 316, a proper identification of the high resolution pole pair 320 can be accomplished by using only the external Hall sensor 340 if the internal reference pulse signal from the processing unit 328 is aligned with a transition of the external Hall sensor 340. In such a case, the external Hall sensor 340 will be in an ON state for every other North to South transition of the high resolution track 320. In this case, the second processing unit 348 reads the local absolute angular position, and then determines which high resolution pole pair 320 is being read by the processing unit 328 by reading the reference pulse signal and the external Hall sensor signal 400.

FIG. 5 shows a Hall sensor array arrangement 500 that can be incorporated into the sensing systems 100, 300 of FIG. 1 and FIG. 3. Particularly, the arrangement 500 shows a total of 16 Hall sensors 504 having a width W. However, in some embodiments, only a portion of the arrangement 500, for example, 25 percent, is used. FIG. 6 shows an example in which only a portion of the arrangement 500 is used. In such cases, signals generated by the arrangement 500 will have a low signal-to-noise ratio ("SNR"). For example, since the sensors 504 generate quadrature signals such as sine and cosine, a 25 percent reduction effectively reduces the arrangement 500 to about half its original length. For example, as shown in FIG. 6, an interior set of sensors 508 for sine signals are used, while an exterior set of sensors 512 are not used. An interior set of sensors 516 for cosine signals are used, while an exterior set of sensors 520 are not used.

To increase the SNR of the generated sensor signal, and thus to allow the arrangement to produce usable signals from the Hall sensor array, outputs of the remaining portions of the Hall sensors 504 are duplicated as follows. FIG. 7 shows a dual full period Hall sensor configuration 700 of the Hall sensor array arrangement 500 of FIG. 5. Particularly, for the sine signals, the outputs of the interior sensors 508 are mirrored at the exterior sensors 512 as shown in 704. For the cosine signals, signs of the interior sensors 516 are reversed at the exterior sensors 520 as shown in 708.

Embodiments described herein have various advantages. For example, an increased signal strength can be achieved by using the signal from twice the number of Hall sensors as in a traditional design. This can also allow for a weaker magnetic target or a larger air gap between a standard magnet and the sensor. If the same air gap is used, the signal will have a better signal to noise ratio, which is beneficial to accuracy. Using twice the number of Halls can produce a more consistent signal as the effect of any offset or gain errors in individual Halls is reduced. Using twice the number of Halls also produces a higher SNR.

Figure 8:
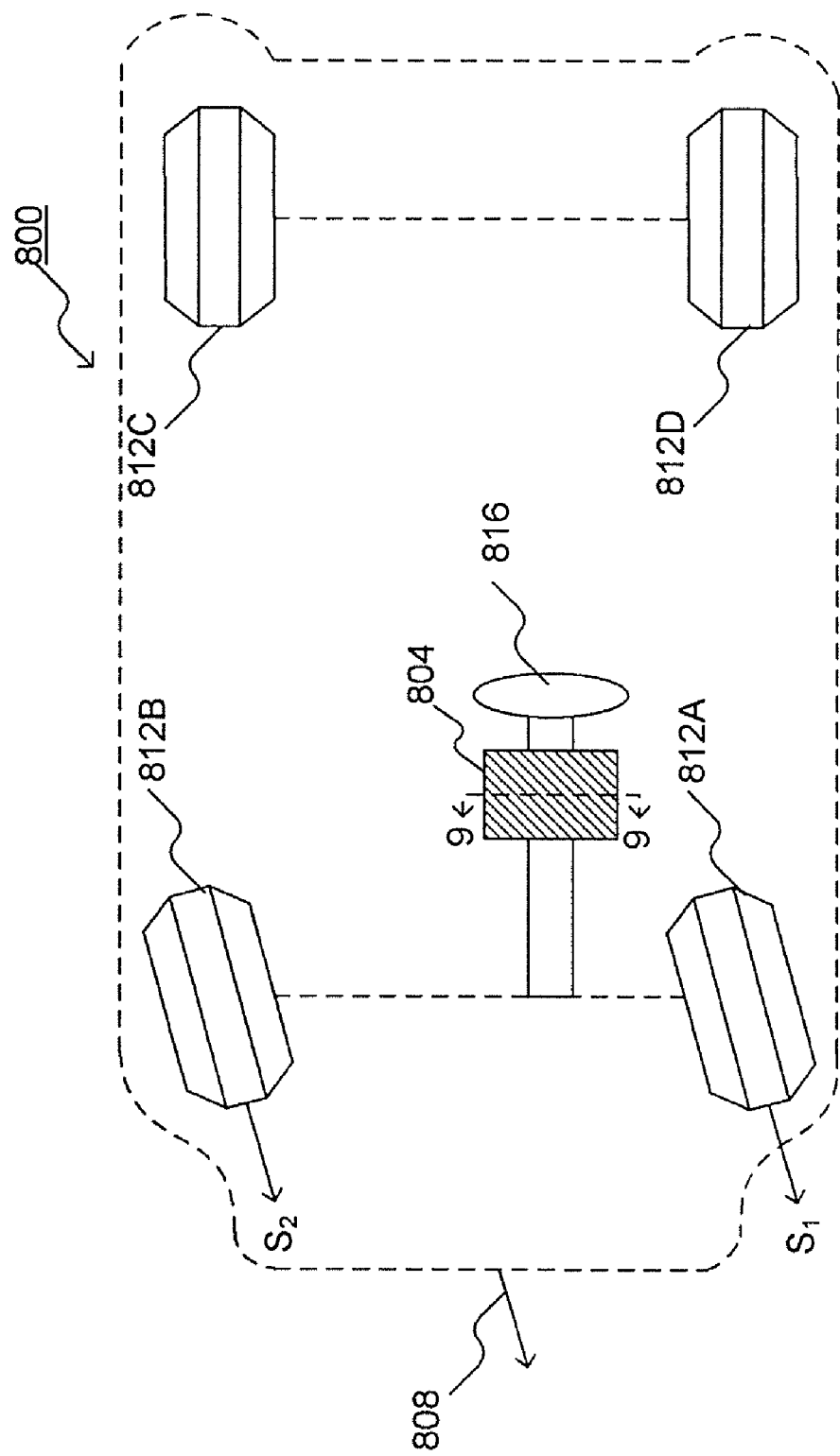
FIG. 8 shows a steering system in a vehicle.

Embodiments of the invention are applicable, for example, in a vehicular environment. FIG. 8 shows a schematic plan view of a motor vehicle 800 having a steering wheel sensing system 804 and turning in a direction indicated by arrow 808. The vehicle 800 has four wheels 812A, 812B, 812C, and 812D. The steering wheel sensing system 804 determines how many revolutions a driver has rotated a steering column 816 with respect to a fixed location. For example, in some embodiments, the steering wheel sensing system 804 can determine an absolute steering column position over three, four, or five turns of the steering wheel or column 816. In the embodiment shown, the vehicle 800 travels in the direction 808 by rotating the wheel 812A at a speed of $s_1$, and the wheel 812B at a speed of $s_2$. In general, when turning, the speed of $s_1$ and the speed of $s_2$ are different, and hence there is a speed differential of the wheels 812A and 812B.

Figure 9:
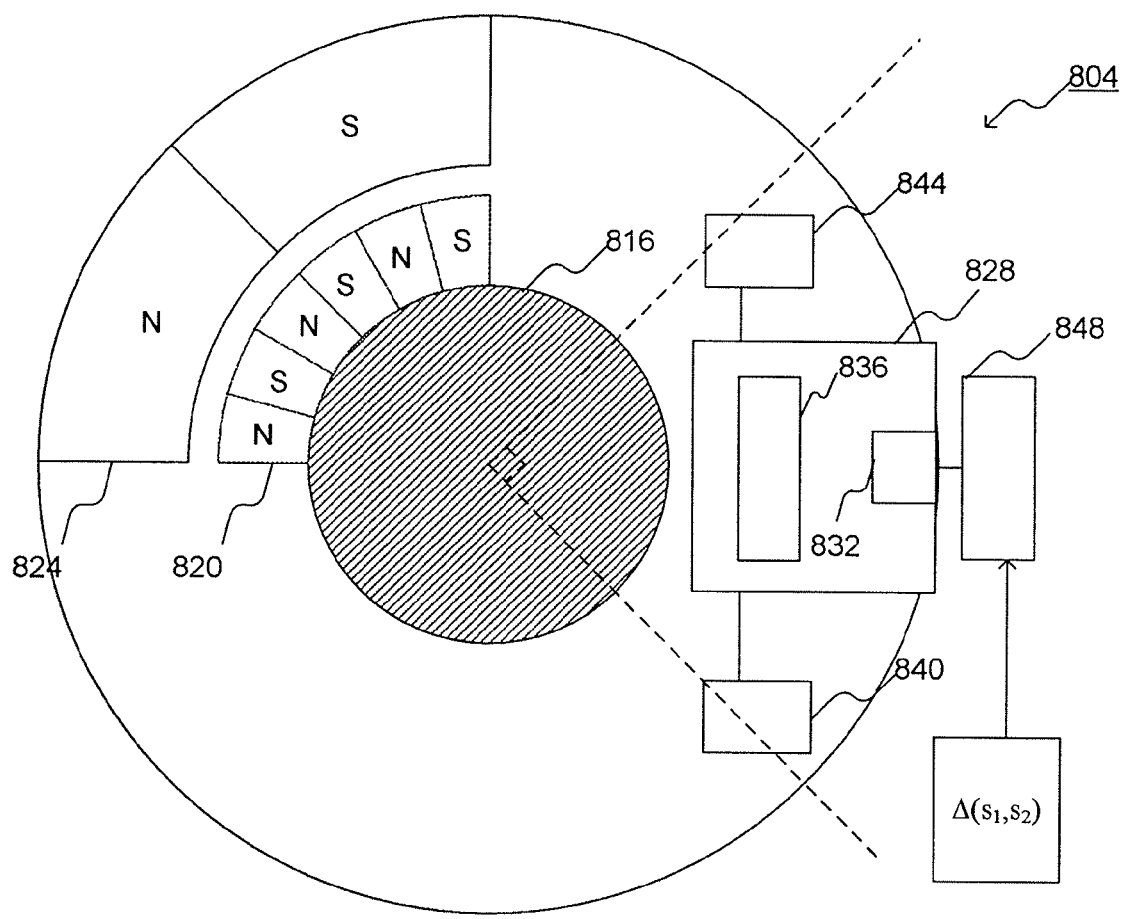
FIG. 9 shows a schematic view of the steering system of FIG. 8.

Instead of using a traditional turn counter, FIG. 9 shows a cross-sectional view of the steering sensing system 804 of FIG. 8 according to an embodiment of the invention by combining a local absolute position as described earlier, and the speed differential. Particularly, FIG. 9 shows that the steering sensing system 804 surrounds the steering column 816. Some components of the steering sensing system 804 are configured to rotate with the steering column 816. For example, the steering sensing system 804 includes a first multi-polar magnetic ring or high resolution track 820 and a multi-polar magnetic ring or low resolution track 824 concentrically encompassing the high resolution track 820.

Furthermore, the steering sensing system 804 also includes a processing unit 828 that is positioned over the high resolution track 820, and the low resolution track 824. In some embodiments, the processing unit 828 includes an interface 832 for interfacing with components external to the processing unit 828. The processing unit 828 also includes an internal sensor array 836 to generate an output that is indicative of an angular position of a high resolution pole pair under the processing unit 828. The steering sensing system 804 also includes a first external sensor 840 that is positioned over the low resolution track 824, and a second external sensor 844 that is also positioned over the low resolution track 824. In the embodiment shown, the exemplary high resolution track has 12 pole pairs, while the exemplary low resolution track 820 has four pole pairs. In such a case, the second external sensor 844 is positioned less than or about 90° from the first external sensor 840.

Similar to the embodiments described above, for example, by combining an absolute position within each segment of a rotation (determined with external sensors) and the speed differential speed signal from the front wheels 812A and 812B, the steering sensing system 804 uses a second processing unit 848 to determine a full absolute position over several turns of the steering wheel 816. Particularly, the differential speed determined from the front wheels 812A, 812B is used to isolate which of all possible 90° segments or sections the steering wheel 816 is in. With a typical steering system such as a 3-turn-lock-to-lock system or a 4-turn-lock-to-lock system, each turn consisting of four 90°-sections, the steering wheel 816 can thus be in 12 to 16 different 90° sections. Although only the front wheels 812A, 812B are described herein, the speeds and directions of the rear wheels 812C, 812D can also be used in other embodiments.

In some embodiments, a ratio of the speeds ($s_1$, $s_2$) between the wheels 812A, 812B changes in proportion to a position of the steering wheel 816. As described above with respect to the motor 104 of FIG. 1, the steering sensing system 804 identifies the absolute position of a steering wheel 816 (or its associated steering column) by using a unique combination of the reference pulse signals generated by the processing unit 828.

For example, as discussed earlier, the steering sensing system 804 uses a local angular position detected by the processing unit 828, segment information detected or identified by the external sensors 840, 844, and differential speed information detected by a plurality of wheel sensors, to generate an absolute position of the steering column 816 that generally repeats multiple times in a revolution. Particularly, the steering sensing system 804 uses the differential speed information from the front wheels 812A, 812B to identify one of the segments 816 in a multiple-turn-lock-to-lock steering system. By adding the unique reference pulses generated from the processing unit 828 for each of the segments 816, a full absolute position within a revolution can be determined without turning the steering column for more than half of a segment. For example, with a four-segment steering wheel 816 and a reference pulse configuration, a reference pulse indicative of a specific segment is generated for each of the four segments within a revolution. As such, a full absolute position within each revolution can be determined by turning the steering wheel 816 a maximum of 45°. That is, once the steering wheel 816 has turned about 45°, the steering wheel 816 has crossed into another quadrant, and a reference pulse is generated.

Furthermore, after rotating the steering wheel 816 for about 30°, the differential signal from the front wheels 812A, 812B can be identified with the reference pulses in each of the segments 816, detailed hereinafter. For example, if the resolution of the speeds detected from the front wheels 812A, 812B is too coarse or not precise enough, or if one of the front wheels 812A, 812B is slipping on sand, the processing unit 828 can generate reference pulses while the steering wheel 816 is turned. As such, if the second processing unit 848 is uncertain about positions of the wheels 812A, 812B due to the above or similar conditions, the reference pulses from each of the segments 816 can be used to identify the segment 816.

FIG. 10 shows a plurality of exemplary reference pulse patterns 1000 in a 4-quadrant embodiment. For example, when there is a change from a North pole to a South pole in a pole pair, a C reference pulse is generated in a corresponding quadrant. Similarly, when there is a change from a South pole to a North pole in a pole pair, a D reference pulse is generated in a corresponding quadrant. Otherwise, when there is no pole change, a 0 reference pulse is generated. As shown in FIG. 10, there is no change in a first quadrant 1004. There are North to South pole changes in a second quadrant 1008. Similarly, there are both North to South and South to North pole changes in the third quadrant 1012, while there are only South to North pole changes in the fourth quadrant 1016.

Various features and advantages of the invention are set forth in the following claims.

What is claimed is:

1. A sensing system for determining an absolute position of a turning device, the sensing system comprising:
   a first multi-polar magnetic ring concentrically positioned with respect to the turning device, having a plurality of pole pairs, and configured to rotate with the turning device;
   a second multi-polar magnetic ring having at least one pole pair and configured to rotate with the first multi-polar magnetic ring and the turning device;
   a first processing unit positioned near the first multi-polar magnetic ring, and configured to determine an angular position of the turning device over one of the pole pairs of the first multi-polar magnetic ring;
   a first sensor positioned external to the first processing unit and adjacent the second multi-polar magnetic ring, and configured to indicate a first state of the at least one pole pair of the second multi-polar magnetic ring;
   a second sensor positioned external to the first processing unit, adjacent the second multi-polar magnetic ring, and being spaced apart from the first sensor, and configured to indicate a second state of the at least one pole pair of the second multi-polar magnetic ring; and
   a second processing unit configured to receive the first and second states and the angular position, and to generate the absolute position of the turning device based on the angular position and the first and second states.

2. The system of claim 1, wherein the first processing unit is further configured to generate a reference pulse from the first multi-polar magnetic ring.

3. The system of claim 2, wherein the second processing unit is further configured to generate an absolute position of the turning device based on the reference pulse, the angular position and the state.

4. The system of claim 1, wherein the at least one pole pair of the second multi-polar magnetic ring has an arc length.

5. The system of claim 4, wherein the first sensor is spaced apart from the second sensor by the arc length.

6. The system of claim 1, wherein each of the first and second states comprises one of an ON value and an OFF value.

7. The system of claim 1, wherein the second processing unit is further configured to generate the absolute position of the turning device based on the angular position and a binary combination of the first and second states.

8. The system of claim 1, wherein the turning device is associated with a steering wheel and a plurality of wheels having a plurality of corresponding rotating speeds, and wherein the second processing unit is further configured to determine a number of rotations the steering wheel has made from the absolute position and a ratio of wheel speeds.

9. The system of claim 1, wherein the absolute position is over a portion of a revolution.

10. The system of claim 1, wherein the first multi-polar magnetic ring is concentrically positioned around the turning device.

11. The system of claim 10, wherein the second multi-polar magnetic ring is positioned around the first multi-polar magnetic ring.

12. The system of claim 1, wherein the first processing unit includes a sensor array configured to detect an angular position over one of the pole pairs of the first multi-polar magnetic ring relative to a pole junction of the one of the pole pairs.

13. The system of claim 1, wherein the second processing unit utilizes the first and second states to identify in which pole pair of the first multi-polar magnetic ring the angular position is detected.

14. The system of claim 1, wherein the turning device includes a motor.

15. A method of determining an absolute position of a turning device, a first multi-polar magnetic ring concentrically positioned with respect to the turning device, a second multi-polar magnetic ring concentrically positioned with respect to the first multi-polar magnetic ring, a processing unit positioned over the first multi-polar magnetic ring, and at least one sensor positioned near the processing unit and over the second multi-polar magnetic ring, the method comprising:
   determining with the processing unit a local pole position of the first multi-polar magnetic ring;
   determining from the at least one sensor at least one state of the second multi-polar magnetic ring; and
   determining from the at least one state and the local pole position an absolute position of the turning device.

16. The method of claim 15, wherein the turning device comprises a steering wheel, and wherein determining from the at least one state and the local pole position an absolute position of the steering wheel comprises:
   determining a plurality of wheel speeds; and
   determining at least one wheel speed ratio.

17. The method of claim 15, further comprising generating a reference pulse from the first multi-polar magnetic ring.

18. The method of claim 15, wherein the at least one sensor comprises first and second sensors, and wherein the first sensor is spaced apart from the second sensor.

19. The method of claim 15, wherein the at least one state comprises first and second states, each of the first and second states having an ON state and an OFF state.

20. The method of claim 19, further comprising:
   determining a binary combination of the ON state and the OFF state; and identifying one of the pole pair of the first multi-polar magnetic ring based on the binary combination.

21. The method of claim 15, wherein the absolute position is over a portion of a revolution.

22. The method of claim 15, further comprising using the state, identifying in which pole pair of the first multi-polar magnetic ring the angular position is detected.

23. The method of claim 15, wherein determining the local pole position includes detecting with a sensor array the local pole position over one of a plurality of pole pairs in the first multi-polar magnetic ring.

* * * * *